(12) United States Patent
Sakaki et al.

(10) Patent No.: US 7,665,569 B2
(45) Date of Patent: Feb. 23, 2010

(54) POWER STEERING SYSTEM

(75) Inventors: Toshimitsu Sakaki, Kanagawa (JP);
Masakazu Kurata, Yokohama (JP);
Toru Takahashi, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 473 days.

(21) Appl. No.: 11/430,085

(22) Filed: May 9, 2006

(65) Prior Publication Data

US 2006/0254850 A1 Nov. 16, 2006

(30) Foreign Application Priority Data

May 10, 2005 (JP) .............................. 2005-136965

(51) Int. Cl.
*B62D 5/06* (2006.01)
(52) U.S. Cl. ...................................................... 180/422
(58) Field of Classification Search ................. 180/421, 180/422, 417
See application file for complete search history.

(56) References Cited

U.S. PATENT DOCUMENTS

| | | | | |
|---|---|---|---|---|
| 4,719,998 A | * | 1/1988 | Hiramatsu et al. | 477/175 |
| 5,057,043 A | * | 10/1991 | Sugimoto et al. | 440/61 R |
| 5,069,037 A | * | 12/1991 | Sakigawa et al. | 60/435 |
| 5,076,383 A | * | 12/1991 | Inoue et al. | 180/417 |
| 5,711,394 A | * | 1/1998 | Fujii et al. | 180/422 |
| 6,978,859 B2 | * | 12/2005 | Torizawa | 180/405 |
| 7,210,554 B2 | * | 5/2007 | Sugiyama et al. | 180/421 |
| 7,213,676 B2 | * | 5/2007 | Soeda et al. | 180/417 |
| 7,427,191 B2 | * | 9/2008 | Kurata et al. | 418/32 |

FOREIGN PATENT DOCUMENTS

JP 2004-276664 A 10/2004

* cited by examiner

*Primary Examiner*—Kevin Hurley
(74) *Attorney, Agent, or Firm*—Foley & Lardner LLP

(57) ABSTRACT

A power steering system includes a hydraulic power cylinder having a first and a second hydraulic chambers, for assisting a steering force of a steering mechanism, a first and a second oil passages respectively connected to the first and second hydraulic chambers, a reversible pump discharging operating oil and providing oil pressure to the hydraulic power cylinder through the first and second oil passages, and a motor connected to the reversible pump and rotating the reversible pump in normal and reverse directions. A steering load detection unit detects a steering load of a steering wheel for steering of the steered road wheels, and a motor control unit outputs a control signal to the motor to bring an actual oil pressure generated by the reversible pump closer to a desired oil pressure determined based on the detected steering load. A discharge amount per rotation of the reversible pump is smaller than or equal to 5 cc.

9 Claims, 4 Drawing Sheets

POWER STEERING SYSTEM

BACKGROUND OF THE INVENTION

The present invention relates to a power steering system which assists steering effort.

In recent years, there have been proposed and developed various power steering systems. One such power steering system has been disclosed in Japanese Patent Provisional Publication No. 2004-276664 (hereinafter is referred to as "JP2004-276664"). In JP2004-276664, the power steering system includes a power cylinder, a reversible pump connected to the power cylinder and pumping out operating oil from a reserve tank into the power cylinder, and a motor which drives or rotates the reversible pump in normal and reverse rotational directions. In addition, a piston is provided within the power cylinder, and the power cylinder and the piston cooperate to define two right and left working pressure chambers therein. Oil pressure (working fluid pressure) is selectively distributed to these right and left pressure chambers by the reversible pump which is driven by the motor, and thereby generating steering assisting force. In JP2004-276664, the power steering system is configured so that substantially all the operating oil discharged from the reversible pump is supplied to the power cylinder.

On the other hand, other power steering systems which employ a control valve have been used. In these power steering systems, operating oil pressurized by a pump is provided into a power cylinder through the control valve. When provided, by means of the control valve, the only required amount of operating oil for steering assist in the operating oil discharged from the pump is provided into the power cylinder. The residual oil other than the operating oil provided into the power cylinder is exhausted to a reserve tank while remaining pressurized.

SUMMARY OF THE INVENTION

In the above power steering systems employing the control valve, however, the residual oil other than the required oil for steering assist is exhausted while remaining pressurized. Therefore, this can be inefficient. Further, parts count increases by the provision of the control valve. On the other hand, in JP2004-276664, the power steering system is not equipped with the control valve. Thus, it does not have the above shortcomings. Instead, due to failing to have the control valve, it is impossible to selectively distribute the operating oil to the power cylinder and the reserve tank. That is, substantially all the operating oil discharged from the pump is provided to the power cylinder. Because of this, in a case where an intrinsic or inherent discharge amount of the pump (pump discharge amount per rotation) is too large, the motor can not work in an efficient range. This therefore results in the increase of electric power consumption. Further, the motor may not respond sufficiently since the inertia of the motor becomes large, and thereby leads to the deterioration in steering feel. On the other hand, as mentioned above, since substantially all the operating oil is provided into the power cylinder, there is a possibility that more operating oil than required will be provided to the power cylinder. To avoid this problem, the pump could be driven at low rpm. However, if the motor works at low rpm, the efficiency of motor is reduced. In this case as well, the electric power consumption increases due to the reduced efficiency of motor. Furthermore, at low rpm, the response of motor is inadequate, and thereby leads to the deterioration in steering feel.

It is therefore an object of the present invention to provide a power steering system which is capable of enhancing steering feel by improving responsiveness under a condition where the motor works in an efficient range.

According to one aspect of the present invention, a power steering system comprises a hydraulic power cylinder having a first hydraulic chamber and a second hydraulic chamber, for assisting a steering force of a steering mechanism adapted to be linked to steered road wheels, a first oil passage connected to the first hydraulic chamber, a second oil passage connected to the second hydraulic chamber, a reversible pump having a pair of outlets each connected to respective one of the first and second oil passages, for discharging operating oil and for providing oil pressure to the hydraulic power cylinder, a motor connected to the reversible pump and rotating the reversible pump in normal and reverse directions, a steering load detection unit detecting a steering load of a steering wheel for steering of the steered road wheels, a motor control unit outputting a control signal to the motor to bring an actual oil pressure generated by the reversible pump closer to a desired oil pressure determined based on the detected steering load, and a discharge amount per rotation of the reversible pump being smaller than or equal to 5 cc.

According to another aspect of the invention, a power steering system comprises a hydraulic power cylinder having a first hydraulic chamber and a second hydraulic chamber, for assisting a steering force of a steering mechanism adapted to be linked to steered road wheels, a first oil passage connected to the first hydraulic chamber, a second oil passage connected to the second hydraulic chamber, a reversible pump having a pair of outlets each connected to respective one of the first and second oil passages, and having internal gears and external gears for discharging operating oil and for providing oil pressure into the hydraulic power cylinder, a motor connected to the reversible pump and rotating the reversible pump in normal and reverse directions, a steering load detection unit detecting a steering load of a steering wheel for steering of the steered road wheels, a motor control unit outputting a control signal to the motor to bring an actual oil pressure generated by the reversible pump closer to a desired oil pressure determined based on the detected steering load, and a volume of the reversible pump formed between the internal and external gears being smaller than or equal to 5 cc.

According to a further aspect of the invention, A power steering system comprises a steering shaft connected to a steering wheel, a pinion connected to the steering shaft, a rack shaft engaged with the pinion, for converting rotational motion of the pinion into lateral axis movement of the rack shaft, the rack shaft adapted to be linked to steered road wheels, a hydraulic power cylinder having a first hydraulic chamber and a second hydraulic chamber, for providing a thrust to the rack shaft in the axial direction thereof, a first oil passage connected to the first hydraulic chamber, a second oil passage connected to the second hydraulic chamber, a reversible pump having a pair of outlets each connected to respective one of the first and second oil passages, and having internal gears and external gears for discharging operating oil and for providing oil pressure into the hydraulic power cylinder, a motor connected to the reversible pump and rotating the reversible pump in normal and reverse directions, a steering load detection unit detecting a steering load of the steering wheel for steering of the steered road wheels, a motor control unit outputting a control signal to the motor to bring an actual oil pressure generated by the reversible pump closer to a desired oil pressure determined based on the detected steering load, and a discharge amount per rotation of the reversible pump being smaller than or equal to 5 cc.

The other objects and features of this invention will become understood from the following description with reference to the accompanying drawings.

DETAILED DESCRIPTION OF THE INVENTION

Figure 1:
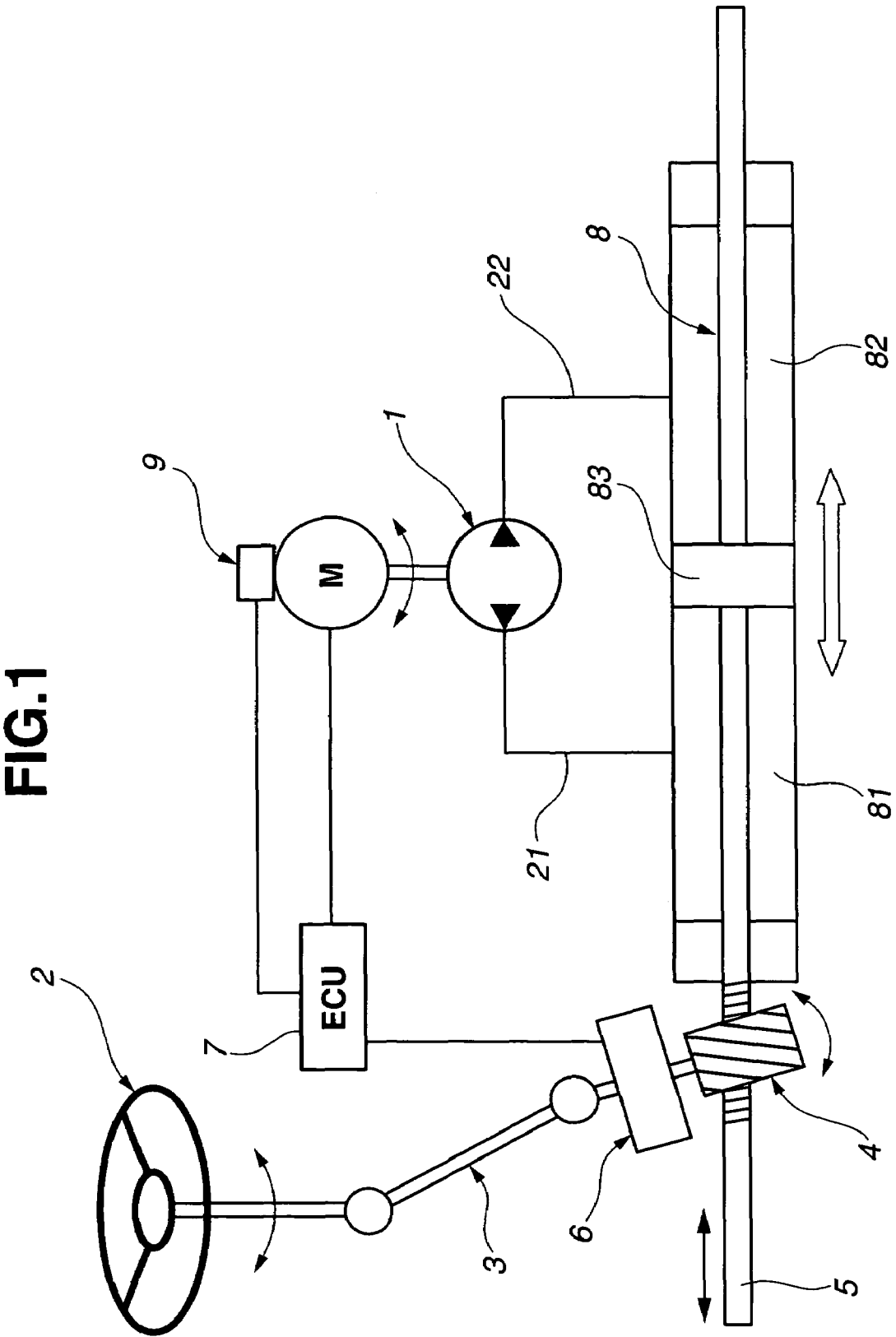
FIG. 1 is a schematic system diagram of a power steering system according to the present invention.

An embodiment of the present invention will be explained below with reference to the drawings. FIG. 1 shows a schematic system diagram of a power steering system. When a driver turns a steering wheel 2 (when steering wheel 2 is turned), a pinion steering gear (or a pinion shaft) 4 is driven through a steering shaft 3. And, by means of a steering mechanism (the so-called rack-and-pinion mechanism; converting rotational motion into lateral axis movement), a rack shaft 5 moves in the axial direction thereof, and thereby steers or turns front wheels (or steered road wheels, not shown). Between steering shaft 3 and pinion steering gear 4, a torque sensor 6 as a steering load detection unit is disposed so as to detect a steering effort (steering load) of steering wheel 2, and outputs a torque signal corresponding to the detected steering load to a ECU (electrical control unit) 7.

In the power steering system, a power steering mechanism is provided for assisting the movement of rack shaft 5 in response to the steering effort of steering wheel 2. The power steering mechanism includes a motor M equipped with a position sensor 9, a reversible pump 1, and a cylinder (a hydraulic power cylinder) 8. Cylinder 8 houses rack shaft 5, and provides a thrust to rack shaft 5 in the axial direction thereof (or assists steering force of the steering mechanism). Further, a piston 83 is provided within cylinder 8. Piston 83 is movable or slidable in the axial direction within cylinder 8. The movement of rack shaft 5 is assisted by way of the movement of piston 83 in the axial direction. Inside of cylinder 8 are two cylinder chambers (or hydraulic chambers, working pressure chambers); a first cylinder chamber 81 and a second cylinder chamber 82 are defined by piston 83. First and second cylinder chambers 81, 82 are respectively communicated with a first oil passage 21 and a second oil passage 22. These first and second oil passages 21, 22 are connected to each of a pair of outlets of reversible pump 1.

As mentioned above, the torque signal is entered from torque sensor 6 into ECU 7. Additionally, a switch signal from an ignition switch, an engine rpm signal detected by an engine rpm sensor, a vehicle speed signal detected by a vehicle speed sensor, and the like, are entered into ECU 7. ECU 7 (as a motor control unit) determines a steering assisting force based on these various informational signals, and outputs a control signal or a command signal to the motor. The motor is therefore driven and drives reversible pump 1 so that a desired oil pressure is generated by reversible pump 1.

Figure 4:
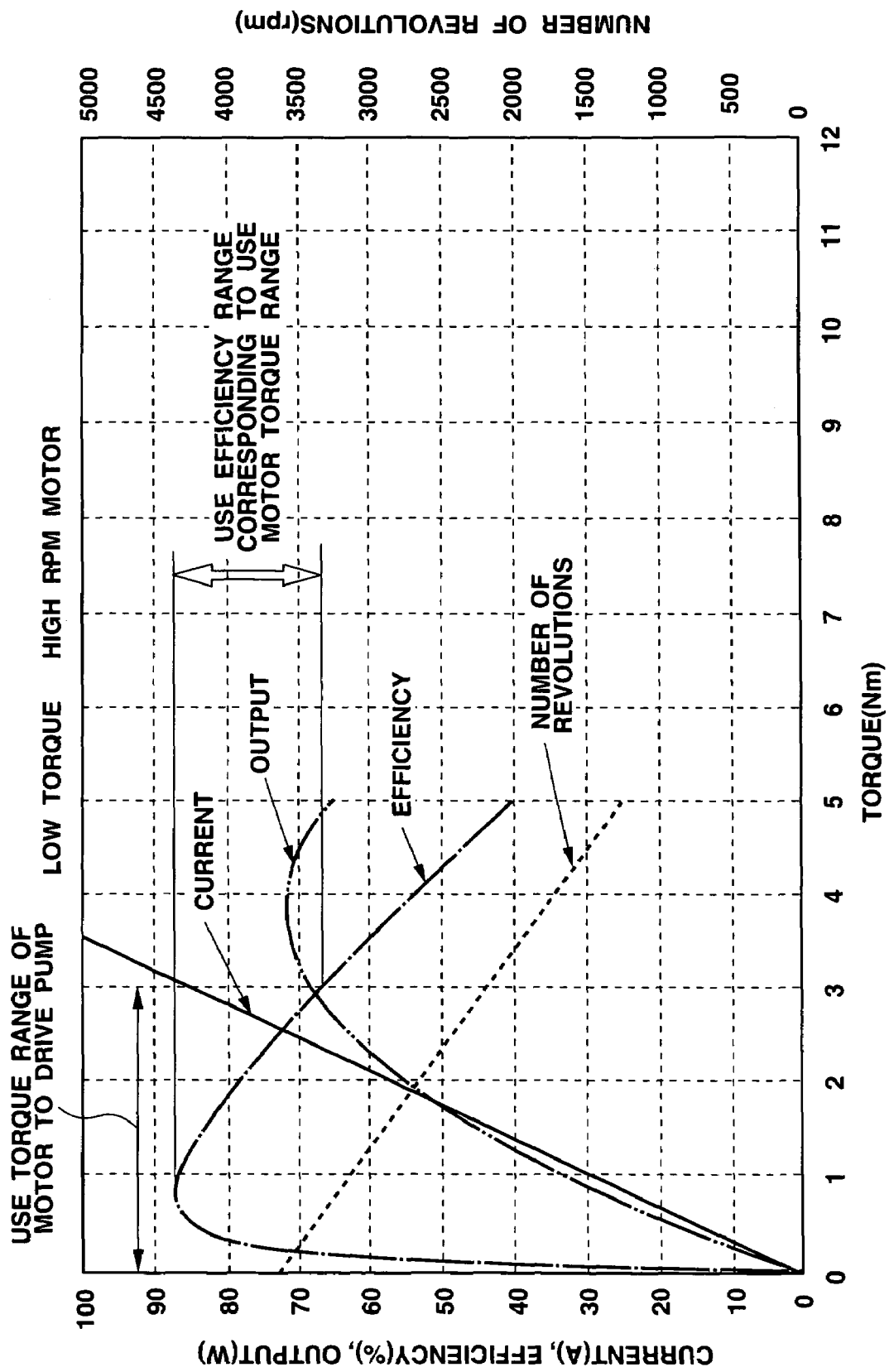
FIG. 4 is performance curves of a power steering motor (low torque·high rpm motor).

As for the motor, a low torque-high rpm brushless-type motor is used for this power steering system, and used in a range where the number of revolutions of the motor is more than 3000 rpm (3000 revolutions per minute). As shown in FIG. 4, when the number of revolutions of the motor is greater than or equal to 3000 rpm, the motor can work in the high efficiency range (its efficiency is greater than to equal to 60 percent (%)). In addition, the brushless-type motor is superior in the inertia characteristic. And thus, by using the brushless-type motor, a response of the power steering system, in which a change of the steering direction in normal and reverse directions frequently occurs, is improved. This leads to enhancement feel.

Furthermore, in order for the motor to work in the high efficiency range, the power steering system is configured so that the motor rotates at between 15 and 38 revolutions per rotation of steering wheel 2 (or per rotation of pinion shaft 4). That is to say, a reduction ratio is set to from 15 to 38. By setting the reduction ratio to greater than or equal to 15, a torque load for the motor is reduced or lightened. This allows use of the above-mentioned low torque·high rpm motor, and enables the inertia of motor to be reduced. On the other hand, by setting the reduction ratio to smaller than or equal to 38, an inertia increase can be reduced or limited. If the reduction ratio is set to too large value, the inertia of motor necessarily becomes large. In this case, it leads to deterioration in the steering feel. Thus, the reduction ratio is set to smaller than or equal to 38. Accordingly, by setting the reduction ratio to a proper ratio (between 15 and 38), the steering feel can be improved.

Figure 2:
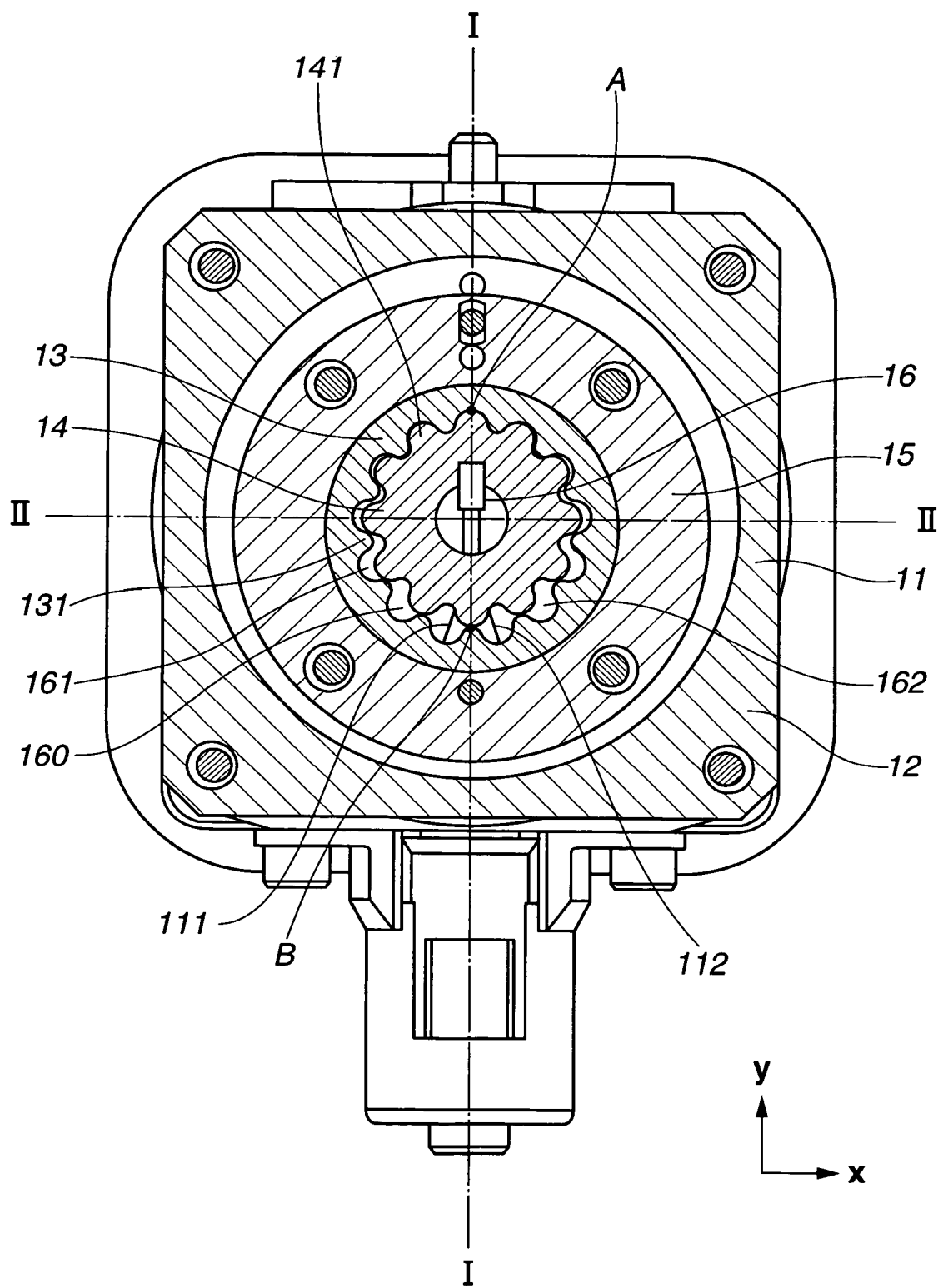
FIG. 2 is a longitudinal cross section of a pump.

Next, the pump for providing the operating oil (oil pressure) to the cylinder will be explained. FIG. 2 shows a longitudinal cross section of pump 1. Pump 1 is the so-called bidirectional trochoid pump, and its number of discharge per rotation (the number of pumping chambers) is greater compared with that of a vane pump. Therefore, the trochoid pump is capable of reducing pump pulsation and pump noises. By using the trochoid pump, vibrations or oscillations can be suppressed, and the steering feel is improved.

Pump 1 has a housing 11, an outer rotor 13, an inner rotor 14, a cam ring 15, and a drive shaft 16. Inner rotor 14, outer rotor 13, cam ring 15 are disposed from center of housing in this order and inserted in an axial direction (z-axis), then accommodated in housing 11. Drive shaft 16 is directly connected to an output shaft of the motor. That is, there is no reduction gear between drive shaft 16 and the motor output shaft. Then, transmission loss is reduced.

Outer rotor 13 is formed with a plurality of internal teeth (or internal gears) 131 in its inner periphery, and rotatably disposed inside cam ring 15. Inner rotor 14 is formed with a plurality of external teeth (or external gears) 141 in its outer periphery, and disposed inside outer rotor 13.

Regarding the pump pulsation, it occurs by internal-external teeth meshing. In more detail, the pump pulsation is related to the number of meshing of internal and external teeth 131, 141 per rotation of pump 1. If the meshing number per rotation of pump 1 is large, the pump pulsation is reduced. Thus, it is preferable that the number of external teeth 141 is set to a value as large as possible for reduction of the pump pulsation. In this embodiment, the number of external teeth 141 is set to greater than or equal to 8, then the pump pulsation is reduced.

Meanwhile, as for the number of internal teeth 131, it is larger than that of external teeth 141 by one. However, it is not limited to one. The number of internal teeth 131 may be larger compared with that of external teeth 141 by two or more. By a difference in the number of internal and external teeth, internal and external teeth 131, 141 are eccentrically meshed or engaged with each other. And as can be seen in FIG. 2, a pumping chamber (a mesh gap, or a gear-meshing area) 160 is formed or defined by the teeth mesh.

Internal and external teeth 131, 141 are meshed well with each other in an upper part thereof, and these are completely meshed with each other at point A shown in FIG. 2. At this time (when meshing at the point A), a volume of pumping chamber 160 is the smallest (the minimum pumping chamber volume). While at point B (at both sides of the point B), the volume of pumping chamber 160 is the greatest (the maximum pumping chamber volume). That is, by the eccentric mesh of internal and external teeth 131, 141, the volume of pumping chamber 160 varies. At the point A and the point B, the pumping chamber volume respectively becomes the smallest and the greatest. More specifically, for example, when inner rotor 14 and outer rotor 13 rotate counterclockwise, each of the pumping chambers in a left side with respect to I-I line (negative direction of x-axis) becomes a suction area or space (or inlet area, inhalation area) 161, and each of the pumping chambers in a right side with respect to I-I line (positive direction of X axis) becomes a discharge area or space (or outlet area, exhalation area) 162. Each volume of suction area gradually becomes greater from the point A toward the point B, while each volume of discharge area gradually becomes smaller from the point B toward the point A by counterclockwise rotation.

As can be seen in FIG. 2, in the left side with respect to I-I line (negative direction of x-axis), a first port 111 is provided. In the right side with respect to I-I line (positive direction of X axis), a second port 112 is provided.

In addition, drive shaft 16 is set parallel to z-axis, and rotates about z-axis. As previously described, drive shaft 16 is connected to the output shaft of the motor shown in FIG. 1, and drives or rotates inner rotor 14. As inner rotor 14 rotates, outer rotor 13 is driven and rotates by the mesh of internal and external teeth 131, 141. That inner and outer rotors 14, 13 are driven by drive shaft 16. Further, as a rotational direction of drive shaft 16 changes from clockwise to counterclockwise or vice versa, a rotational direction of inner and outer rotors 14, 13 also changes in response to the rotational direction change of drive shaft 16. Thus, by way of the clockwise-counterclockwise rotation of drive shaft 16, pump 1 functions as the bidirectional pump for discharging the operating oil.

In this embodiment, a discharge amount per rotation of pump 1, namely an intrinsic or inherent discharge amount of the pump, is set so that it is from 1 cc (cubic centimeters) to 5 cc in one rotation of pump 1. Or, internal and external teeth 131, 141 can be formed so that the volume of pumping chamber 160 (a volume of mesh gap or gear-meshing area, or a volume of pump 1 formed between internal and external teeth 131, 141) is from 1 cc to 5 cc.

Figure 3:
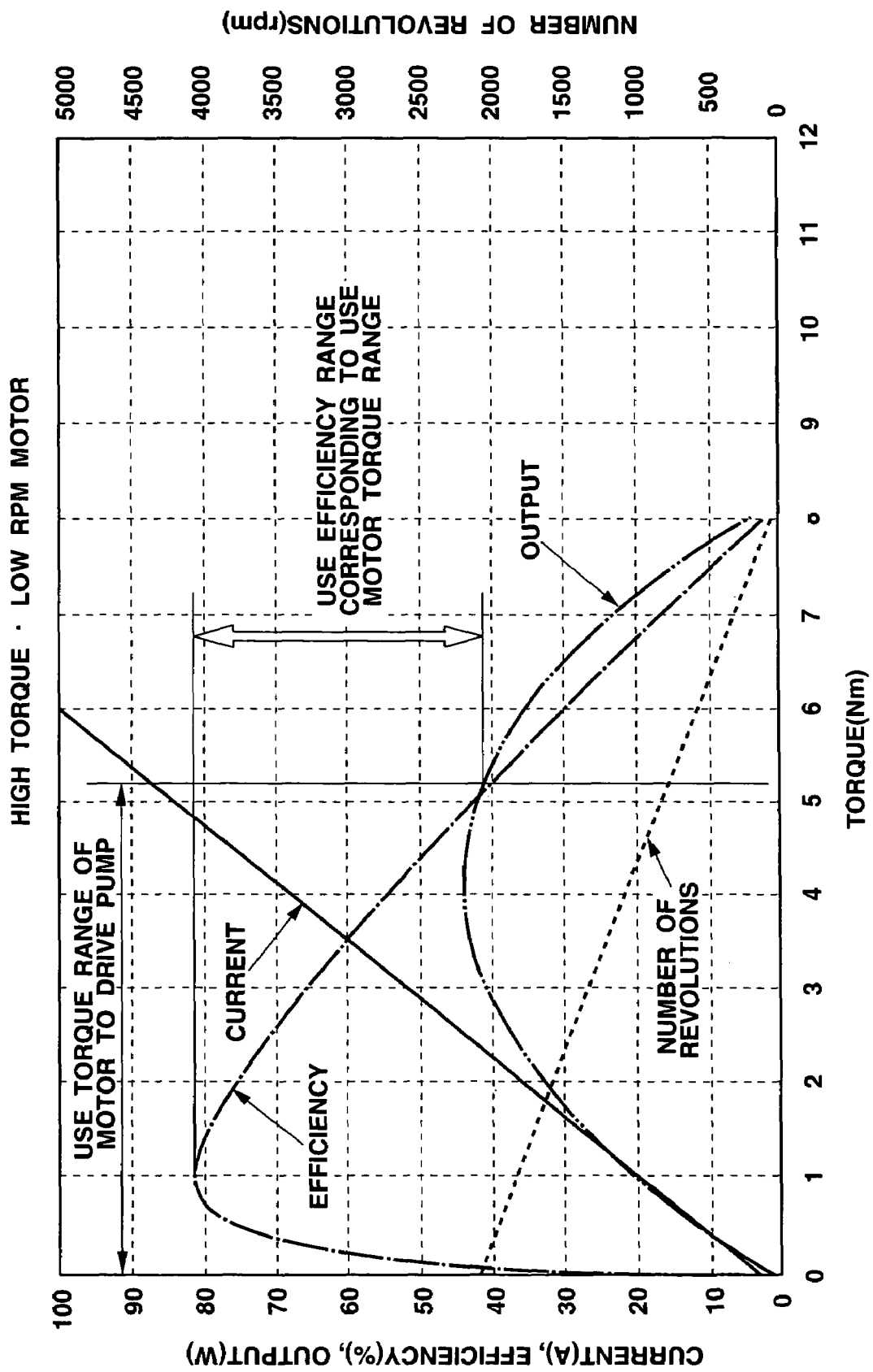
FIG. 3 is performance curves of a power steering motor (high torque·low rpm motor).

Next, a relationship between torque, the number of revolutions and efficiency of a power steering motor will be explained. FIGS. 3 and 4 are performance curves of a motor typically used for driving pump in a power steering system. FIGS. 3 and 4 respectively show the performance curves of high torque·low rpm motor, and of low torque·high rpm motor.

If the inherent discharge amount of pump is large, a high motor torque to discharge the operating oil from pumping chamber 160 toward cylinder 8 is required. Therefore, it can be said that the greater the inherent discharge amount, the more desirable the use of the high torque-low rpm motor. However, even with the high torque-low rpm motor, the efficiency of the motor decreases with an increase of the torque load from a certain value. For instance, in the high torque-low rpm motor shown in FIG. 3, the efficiency of the motor becomes maximum (more than 80 percent) when the load torque is around 1 N·m. On the other hand, when the load torque is around 5 N·m, the motor efficiency greatly decreases, and it becomes on the order of 40 percent. Accordingly, in a case where a required maximum motor torque is 5 N·m for the increase of inherent discharge amount of the pump, a use range of efficiency of the high torque-low rpm motor is from 80 to 40 percent. This is undesirable for efficiency reasons.

For this efficiency problem, if the inherent discharge amount of the pump is small, the required maximum motor torque can be decreased. This allows use of the low torque·high rpm motor. As shown in FIG. 4, although the efficiency of the low torque·high rpm motor decreases with increase of load torque from a certain value, the efficiency is higher compared with that of the high torque·low rpm motor in a low torque range. For example, when the required maximum motor torque is 3 N·m, the efficiency of motor is over 60 percent. When the motor torque is less than 3 N·m, the efficiency is higher than that of the high torque·low rpm motor. Therefore, by setting the required maximum motor torque itself to a lower value, the low torque·high rpm motor can work in the high efficiency range. That is, by setting the inherent discharge amount of the pump to a value as small as possible and lowering the required maximum torque of the motor, it is possible to drive the low torque·high rpm motor in the high efficiency range and to use this motor. In this embodiment, the inherent discharge amount of the pump is set to smaller than or equal to 5 cc so that the required maximum motor torque becomes less than or equal to 3 N·m. This setting makes it possible to bring reduction of electric power consumption needed to generate the same workload (output).

On the other hand, regarding the inherent discharge amount, the smaller the inherent discharge amount of pump 1, the smaller the quantity of oil flow. Because of this, in order to secure a required cylinder thrust in the power steering system, there is a need to diminish the volume of the cylinder and to raise or increase oil pressure (working fluid pressure). However, if the oil pressure increases, resistance to pressure of a seal member, pipes, tubes and the like, needs to be increased. Accordingly, if the inherent discharge amount of pump 1 is too small (here, if less than 1 cc), this results in high production costs for enhancement of the resistance to pressure. Thus, in this embodiment, in order to be able to secure the minimum quantity of oil flow required for producing the cylinder thrust, the inherent discharge amount of pump 1 is set to greater than or equal to 1 cc. By this setting, there is no need to raise the oil pressure to ensure the cylinder thrust.

As explained above, in the shown embodiment, the inherent discharge amount of pump 1 is optimized, namely that it is set to from 1 cc to 5 cc (greater than or equal to 1 cc and smaller than or equal to 5 cc), and thereby sets the required motor torque for driving the pump to less than or equal to 3 N·m, further secures the required quantity of oil flow. In addition, the motor can work at more than 60% efficiency under the condition where the required maximum motor torque is 3 N·m, then the electric power consumption can be reduced. Furthermore, it is possible to improve the use efficiency of motor under such condition, and even a small and low output motor can become sufficiently used for the power steering system. Moreover, since the inherent discharge amount of pump 1 is set to a small amount (namely, smaller than or equal to 5 cc), the pump pulsation can be reduced and also the steering feel can be improved. While since the inherent discharge amount of pump 1 is set to greater than or equal to 1 cc, the required minimum quantity of oil flow is obtained, and then the oil pressure increase to secure the cylinder thrust can be prevented. Accordingly, there is no need of provision for the resistance to pressure, which results in high production costs, and the system can be realized at low cost.

This application is based on a prior Japanese Patent Application No. 2005-136965 filed on May 10, 2005. The entire contents of this Japanese Patent Application No. 2005-136965 are hereby incorporated by reference.

Although the invention has been described above by reference to certain embodiment of the invention, the invention is not limited to the embodiment described above. Further, design changes or engineering-change based on the embodiment are also included in the invention. Modifications and variations of the embodiment will occur to those skilled in the art in light of the above teachings. The scope of the invention is defined with reference to the following claims.

What is claimed is:

1. A power steering system comprising:
    a hydraulic power cylinder having a first hydraulic chamber and a second hydraulic chamber, for assisting a steering force of a steering mechanism adapted to be linked to steered road wheels;
    a first oil passage connected to the first hydraulic chamber;
    a second oil passage connected to the second hydraulic chamber;
    a reversible pump having a pair of outlets each connected to respective one of the first and second oil passages, for discharging operating oil and for providing oil pressure to the hydraulic power cylinder;
    a motor connected to the reversible pump and rotating the reversible pump in normal and reverse directions;
    a steering load detection unit detecting a steering load of a steering wheel for steering of the steered road wheels;
    a motor control unit outputting a control signal to the motor to bring an actual oil pressure generated by the reversible pump closer to a desired oil pressure determined based on the detected steering load; and
    a discharge amount per rotation of the reversible pump being smaller than or equal to 5 cc,
    wherein a maximum motor torque required to drive the reversible pump is less than a motor torque at a maximum output of the motor.

2. The power steering system as claimed in claim 1, wherein:
    the discharge amount per rotation of the reversible pump is greater than or equal to 1 cc.

3. The power steering system as claimed in claim 1, wherein:
    the reversible pump is a trochoid pump.

4. The power steering system as claimed in claim 3, wherein:
    the trochoid pump has external gears whose number is greater than or equal to 8.

5. The power steering system as claimed in claim 1, wherein:
    a maximum number of revolutions of the motor is greater than or equal to 3000 revolutions per minute.

6. The power steering system as claimed in claim 1, wherein:
    the reversible pump has a drive shaft directly connected to an output shaft of the motor.

7. The power steering system as claimed in claim 1, wherein:
    the motor is a brushless motor.

8. The power steering system as claimed in claim 1, wherein:
    the motor rotates at greater than or equal to 15 revolutions per rotation of the steering wheel.

9. The power steering system as claimed in claim 1, wherein:
    the motor rotates at smaller than or equal to 38 revolutions per rotation of the steering wheel.

* * * * *